(12) United States Patent
Lim

(10) Patent No.: US 7,649,603 B2
(45) Date of Patent: Jan. 19, 2010

(54) METHOD FOR MANUFACTURING AN IN-PLANE SWITCHING IPS MODE LIQUID CRYSTAL DISPLAY DEVICE WITH VERTICAL ALIGNMENT FILM

(75) Inventor: Young Nam Lim, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 469 days.

(21) Appl. No.: 11/453,080

(22) Filed: Jun. 15, 2006

(65) Prior Publication Data
US 2007/0097304 A1    May 3, 2007

(30) Foreign Application Priority Data
Nov. 2, 2005    (KR)    ............. 10-2005-0104057

(51) Int. Cl.
*G02F 1/1337*    (2006.01)
*G02F 1/1333*    (2006.01)
(52) U.S. Cl. ............... 349/130; 349/123; 349/124; 349/125; 349/126; 349/131; 349/141
(58) Field of Classification Search ............ 349/130, 349/141, 122–126, 131
See application file for complete search history.

(56) References Cited
U.S. PATENT DOCUMENTS

| | | | | |
|---|---|---|---|---|
| 3,731,986 A | * | 5/1973 | Fergason | .............. 349/33 |
| 3,938,242 A | * | 2/1976 | Sussman | .............. 156/145 |
| 5,442,224 A | * | 8/1995 | Yoshimizu et al. | .......... 257/536 |
| 6,108,064 A | * | 8/2000 | Minoura et al. | ............. 349/130 |
| 7,298,445 B1 | * | 11/2007 | Choi et al. | .................. 349/141 |
| 2003/0043098 A1 | * | 3/2003 | Aoyama et al. | ............... 345/87 |
| 2004/0160563 A1 | * | 8/2004 | Ashizawa et al. | ........... 349/141 |
| 2005/0146662 A1 | * | 7/2005 | Inoue et al. | ................. 349/129 |
| 2006/0202162 A1 | * | 9/2006 | Lin et al. | ................. 252/299.4 |

* cited by examiner

*Primary Examiner*—David Nelms
*Assistant Examiner*—Hoan C Nguyen
(74) *Attorney, Agent, or Firm*—McKenna Long & Aldridge LLP

(57) ABSTRACT

Provided are an in-plane switching mode liquid crystal display device and a method for manufacturing the same. The device comprises a thin film transistor array substrate, a color filter substrate, and a liquid crystal. The thin film transistor array substrate has a common electrode and a pixel electrode arranged in an alternating pattern with each other, and has a first alignment film provided on the common electrode and the pixel electrode so as to align liquid crystal molecules in a vertical direction. The color filter substrate faces the thin film transistor array substrate, and has a second alignment film that aligns the liquid crystal molecules in a vertical direction. Liquid crystal is injected between the thin film transistor array substrate and the color filter substrate.

9 Claims, 10 Drawing Sheets

Top View

Side View

METHOD FOR MANUFACTURING AN IN-PLANE SWITCHING IPS MODE LIQUID CRYSTAL DISPLAY DEVICE WITH VERTICAL ALIGNMENT FILM This application claims the benefit of Korean Patent Application No. 2005-0104057, filed on Nov. 2, 2005, which is hereby incorporated by reference for all purposes as if fully set forth herein.

BACKGROUND OF THE INVENTION

1. Field of the Invention

The present invention relates to a liquid crystal display device, and more particularly, to an in-plane switching mode liquid crystal display device and a method for manufacturing the same.

2. Discussion of the Related Art

A liquid crystal display device refers to a display apparatus in which a liquid crystal material having anisotropic permittivity is provided between a color filter (CF) substrate and a thin film transistor (TFT) array substrate that are upper and lower transparent insulating substrates. An intensity of an electric field provided in the liquid crystal material is controlled such that a molecular arrangement of the liquid crystal material is changed, and an amount of light transmitted to the transparent insulating substrate through the liquid crystal material is controlled, thereby displaying a desired image. In the liquid crystal display device, a thin film transistor liquid crystal display (TFT LCD) using a thin film transistor (TFT) as a switching element is mainly used.

An electro-optical characteristic of a liquid crystal cell is greatly dependent on formation of an alignment film and a surface treatment state based on rubbing. The alignment film is provided on an uppermost layer of the TFT array substrate and the color filter (CF) substrate, and its surface is rubbed to arrange liquid crystal molecules in a particular direction.

In multidomain vertical alignment (MVA) and patterned vertical alignment (PVA) technologies that are vertical alignment (VA) mode technologies using vertical alignment, a negative dielectric liquid crystal is used to align the liquid crystal molecules perpendicularly to the alignment film. Therefore, the alignment film is not rubbed. However, in a twisted nematic mode liquid crystal cell, alignment films of a TFT array substrate and a CF substrate have rubbing directions perpendicular to each other. For example, in order to provide a characteristic of an optimal viewing angle based on a front and down direction, the TFT array substrate is rubbed from a left and up direction to a right and down direction on the basis of a screen of a liquid crystal panel, and the CF substrate is rubbed from a left and down direction to a right and up direction.

FIG. 1 is a sectional view simply illustrating an in-plane switching mode liquid crystal display device according to the related art.

In FIG. 1, the in-plane switching mode liquid crystal display device comprises a TFT array substrate 10 and a color filter substrate 20 spaced apart from each other and sealed, and a liquid crystal (LC) injected therebetween. First and second polarization plates 30 and 31 are provided on a bottom of the TFT array substrate 10 and a top of the color filter substrate 20, respectively.

A common electrode 11 and a pixel electrode 12 are spaced apart and provided at a pixel region of the TFT array substrate 10 on the same plane. In-plane switching based on a horizontal direction that is provided as voltage is applied to the common electrode 11 and the pixel electrode 12 drives a liquid crystal (LC).

First and second alignment films 13 and 21 are provided over the TFT array substrate 10 and define an initial alignment of the liquid crystal (LC). The first and second alignment films 13 and 21 are rubbed at a pretilt angle of about 1.5° so that the initial alignment of the liquid crystal (LC) is aligned in a horizontal direction of a substrate surface.

An in-plane switching mode liquid crystal display device according to the related art is in a normally black state, and does not allow light transmission before voltage is applied. If voltage is applied to the common electrode 11 and the pixel electrode 12, an electric field is provided between the two electrodes 11 and 12 and the liquid crystal (LC) is aligned depending on the electric field provided between the two electrodes 11 and 12. After voltage is applied, internal light is transmitted depending on the alignment of the liquid crystal (LC), thereby displaying a white state. The liquid crystal (LC) has positive (+) dielectric anisotropy, and has a characteristic in which a long axis is aligned in an electric field direction.

In an off-state in which in-plane switching mode is applied to the common electrode 11 and the pixel electrode 12, the alignment direction of the liquid crystal (LC) does not change. In comparison to this, in an on-state in which the in-plane switching mode is applied, the alignment direction of the liquid crystal (LC) is changed, and the liquid crystal (LC) is aligned at a twisted angle of about 45° in comparison to the off-state.

FIGS. 2A and 2B are reference views illustrating the rubbing direction of the horizontal alignment film, and the alignment of the liquid crystal based thereon in FIG. 1, illustrate a side view and a top view, respectively.

Polarization axes (POL and ANAL) of the first and second polarization plates 30 and 31 are perpendicular to each other, and are associated with rubbing directions (alignment processing directions) of the first alignment film 13 and the second alignment film 21.

In the in-plane switching mode, the first and second alignment films 13 and 21 of FIG. 1 are generally formed using the horizontal alignment film. In this case, near an electrode having a step such as the common electrode 11 or the pixel electrode 12, an alignment state of the liquid crystal (LC) is provided as shown in FIGS. 2A and 2B.

However, if the horizontal alignment film is used in the in-plane switching mode, rubbing is not performed due to an electrode edge part at a side of a rubbing direction. Accordingly, as shown in FIGS. 2A and 2B, in a step coverage region (R1), arrangement of the liquid crystal is not uniform, and the region does not have anisotropy in comparison to other regions in which the rubbing is performed.

As such, in the horizontal alignment film, if the rubbing is not performed, the alignment of the liquid crystal is remarkably deteriorated and, for example, there is a drawback in that, when black is embodied, the region generates phase delay due to non-uniform rubbing and therefore, light leakage is caused and luminance is increased, thereby not clearly embodying the black.

SUMMARY OF THE INVENTION

Accordingly, the present invention is directed to an in-plane switching mode liquid crystal display device and method for manufacturing the same that substantially obviates one or more of the problems due to limitations and disadvantages of the related art.

An advantage of the present invention is to provide an in-plane switching mode liquid crystal display device and a method for manufacturing the same, in which a vertical alignment film is employed to prevent light leakage at an edge of an electrode that is not well rubbed, thereby improving black luminance.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided an in-plane switching mode liquid crystal display device comprising a thin film transistor array substrate, a color filter substrate, and a liquid crystal. The thin film transistor array substrate has a common electrode and a pixel electrode arranged in an alternating pattern with each other, and has a first alignment film provided on the common electrode and the pixel electrode so as to align liquid crystal molecules in a vertical direction. The color filter substrate faces the thin film transistor array substrate, and has a second alignment film for aligning the liquid crystal molecules in a vertical direction. Liquid crystal is injected between the thin film transistor array substrate and the color filter substrate.

In another aspect of the present invention, there is provided a method for manufacturing an in-plane switching mode liquid crystal display device, comprising: providing a common electrode and a pixel electrode on an pixel region wherein the common and pixel electrodes are not in a switching region of a pixel region, depositing a metal thin film on the pixel region, rubbing the metal thin film, and anodizing the rubbed metal thin film to provide an inorganic vertical alignment film.

In a further another aspect of the present invention, there is provided a method for manufacturing an in-plane switching mode liquid crystal display device, comprising a common electrode and a pixel electrode on an pixel region wherein the common and pixel electrodes are not in a switching region of a pixel region, depositing an organic vertical alignment film on the pixel region, and rubbing the organic vertical alignment film.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
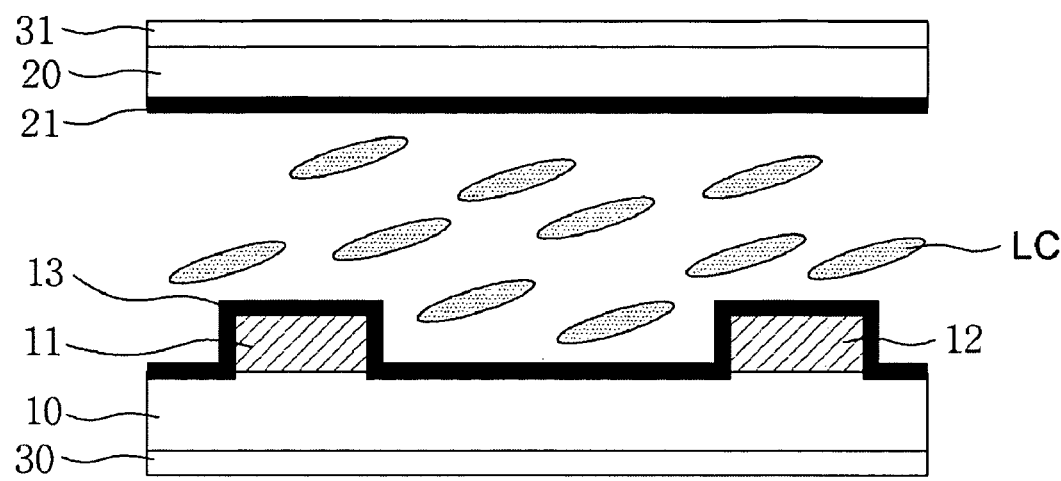
FIG. 1 is a sectional view simply illustrating an in-plane switching mode liquid crystal display device according to the related art.
Figure 2A:
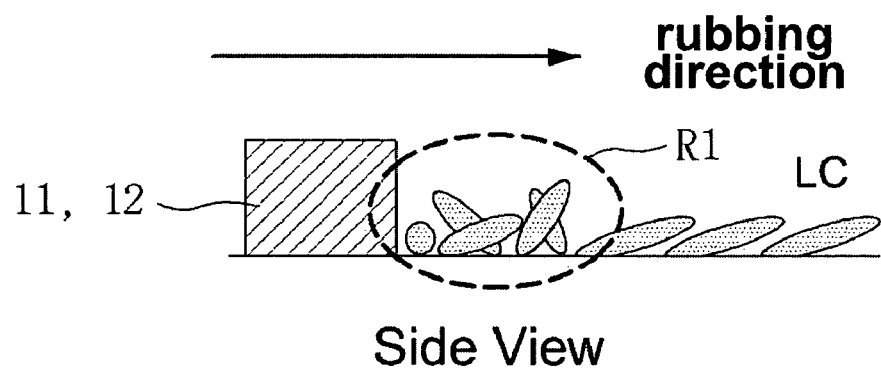
FIGS. 2A and 2B are reference views illustrating a rubbing direction of a horizontal alignment film, and alignment of a liquid crystal based thereon in FIG. 1.
Figure 2B:
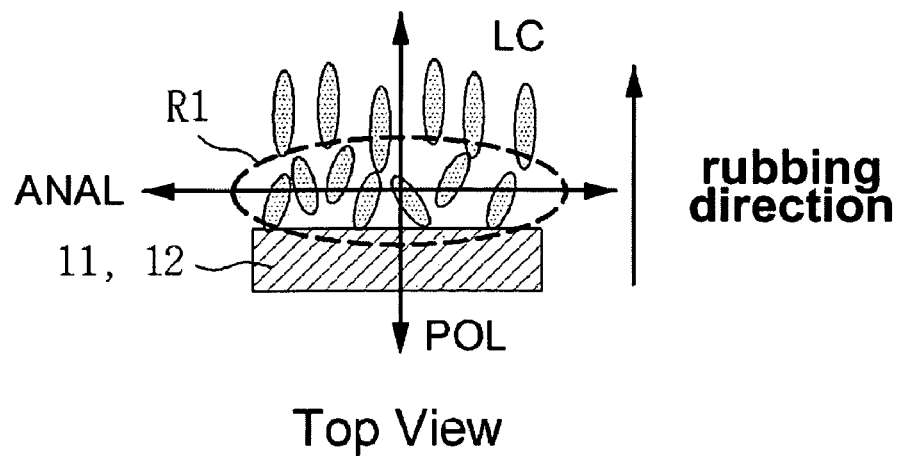
Figure 3:
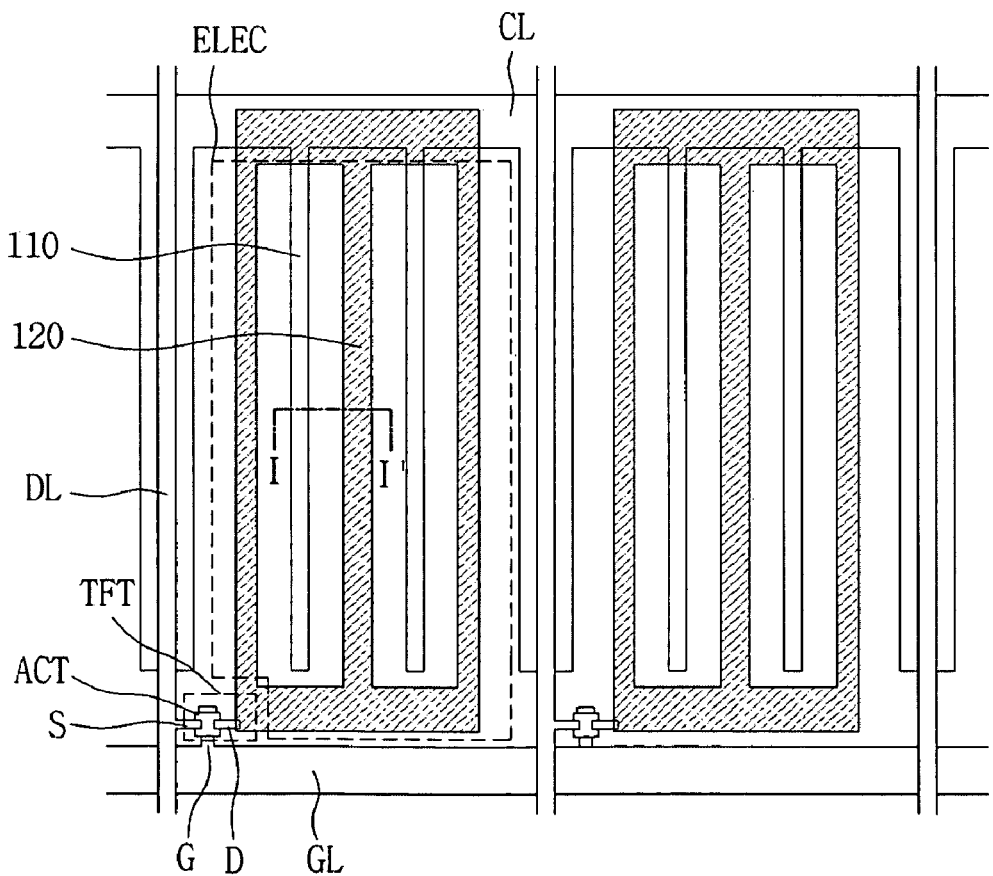
FIG. 3 is a plan view illustrating an in-plane switching mode liquid crystal display device according to an embodiment of the present invention.

FIG. 3 is a plan view illustrating an in-plane switching mode liquid crystal display device according to an embodiment of the present invention.

In FIG. 3, the in-plane switching mode liquid crystal display device according to an embodiment of the present invention, a gate line (GL) and a data line (DL) are arranged and cross with each other to define a pixel region. The pixel region is divided into a switching region (TFT) in which a thin film transistor is positioned, and an pixel region (ELEC) other than the switching region (TFT).

In a detailed description, the gate line (GL) and a common line (CL) are arranged in parallel in a first direction, and the data line (DL) crossing the gate line (GL) is arranged in a second direction. A gate electrode (G), a semiconductor layer (ACT) provided thereon, and a source electrode (S) and a drain electrode (D) disposed at left and right sides of the semiconductor layer (ACT) form the thin film transistor.

The gate electrode (G) is branched at one side of the gate line (GL), and the source electrode (S) is provided and overlapped with the gate electrode (G) by a predetermined area at the data line (DL) near the gate electrode (G). The drain electrode (D) is provided at a position corresponding to the source electrode (S). A plurality of common electrodes 110 branched from the common line (CL) are provided. A pixel connecting line connects to the drain electrode (D), and a plurality of pixel electrodes 120 branched from the pixel connecting line are provided. The common electrodes 110 and the pixel electrodes 120 are arranged in an alternating pattern with each other.

Figure 4:
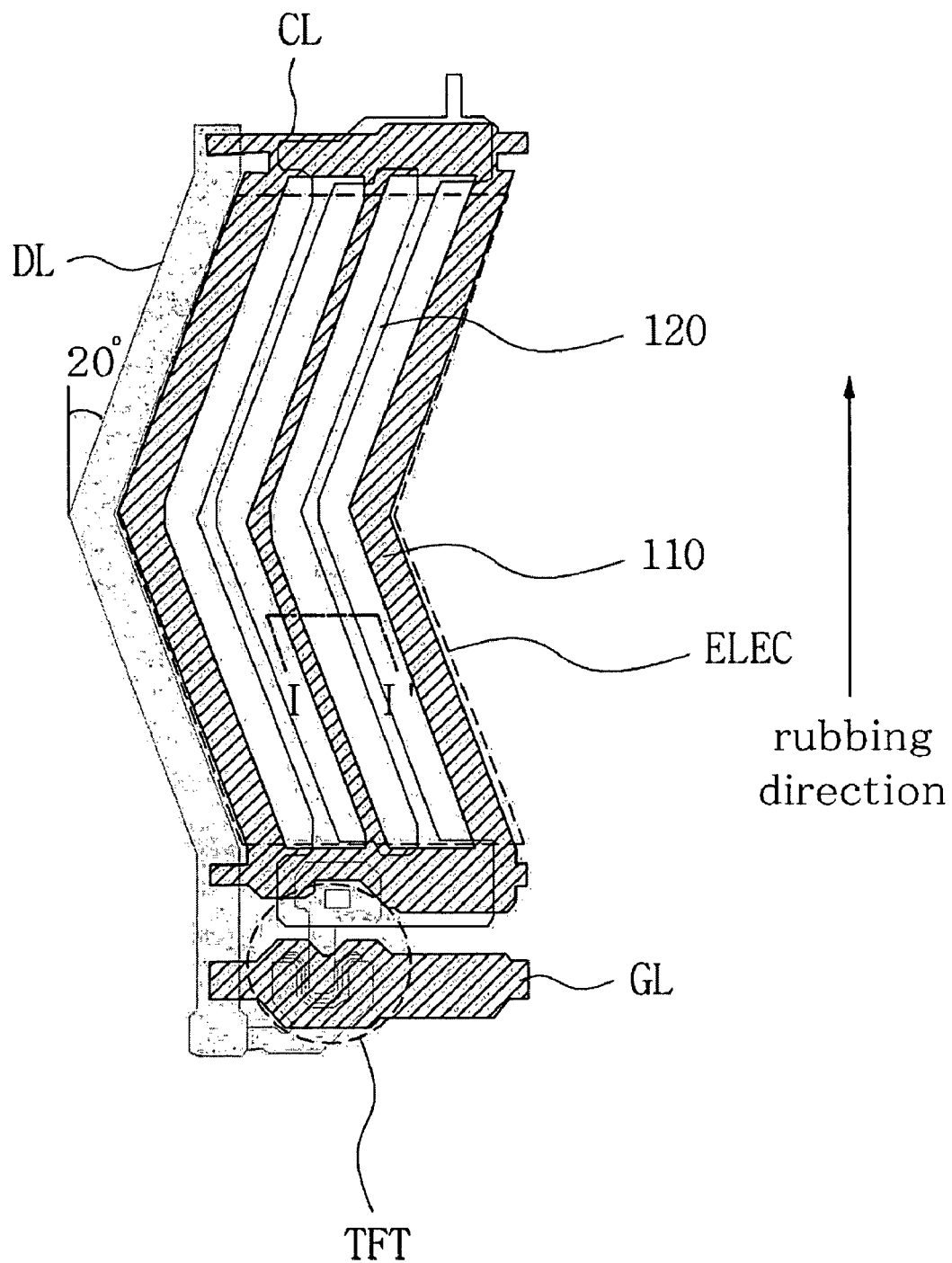
FIG. 4 is a plan view illustrating an in-plane switching mode liquid crystal display device according to another embodiment of the present invention.

FIG. 4 is a plan view illustrating an in-plane switching mode liquid crystal display device according to another embodiment of the present invention, and illustrates a structure in which the common electrodes 110 and the pixel electrodes 120, arrayed in an alternating pattern with each other, are formed in zigzag shape, thereby compensating for weak points of a contrast ratio and a response speed and providing a wider viewing angle.

In this structure, the rubbing direction can be provided from up to down. In rubbing, the well rubbed electrode edge part (for example, region rubbed up by a rubbing bar) and a poorly rubbed step part (for example, region rubbed down by the rubbing bar) are generated depending on a folded structure and a rubbing condition.

Figure 5:
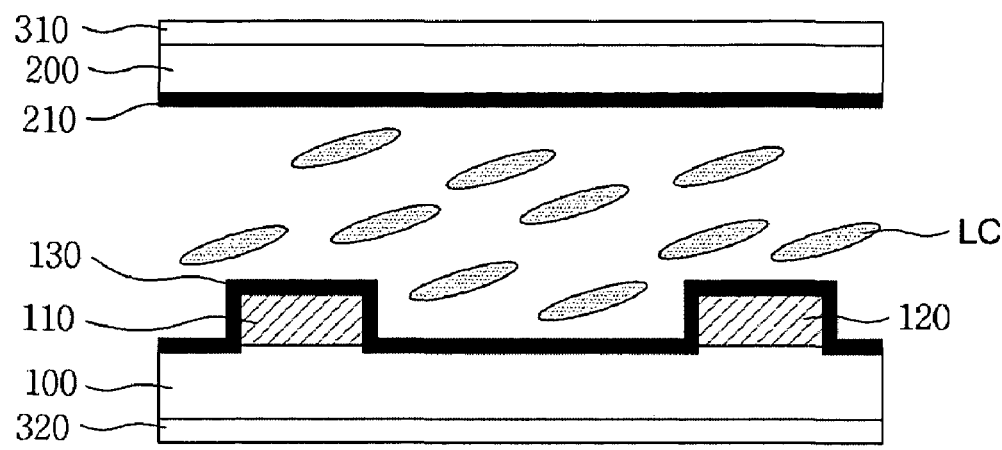
FIG. 5 is a sectional view simply illustrating a surface along line I-I' of FIG. 3 or 4.

The sectional view taken along the line I-I' of FIG. 3 or 4 can be illustrated as in FIG. 5. FIG. 5 shows the color filter (CF) substrate 200 corresponding to an I-I' region of a TFT array substrate 100 together, and omits other layers not pertinent to this discussion but provided on the TFT array substrate 100, such as a gate insulator and a passivation layer, in view of a characteristic of the present invention treating the alignment of the liquid crystal (LC).

In the in-plane switching mode liquid crystal display devices according to an another embodiment of the present invention, the TFT array substrate 100 and the color filter substrate 200 are disposed to face each other with the liquid crystal (LC) interposed therebetween.

The common electrodes 100 and the pixel electrodes 200 are arranged to alternate with each other on the TFT array substrate 100 (arrangement based on a straight-lined or folded shape). When voltage is applied, the common electrodes 110 and the pixel electrodes 120 are provided in-plane switching in a horizontal direction, and drive the liquid crystal (LC). First and second alignment films 130 and 210 are perpendicularly aligned and provided on the TFT array substrate 100 and the color filter substrate 200, respectively.

The first and second alignment films 130 and 210 are formed using an inorganic vertical alignment film formed of, for example, $Al_2O_3$, or an organic vertical alignment film formed of, for example, a polyimide-based polymer material.

The inorganic vertical alignment film has excellent chemical stability in comparison to an organic vertical alignment film and therefore, can provide excellent lightfastness.

The organic vertical alignment film of $Al_2O_3$ can be formed in such a anodic porous alumina-following rubbing (APA-FR) method that, after aluminum (Al) is deposited and rubbed (rubbing depth is about 0.4 mm or more), voltage is applied in an oxidation-state, cleaning is performed for 60 seconds in de-ionized water, and drying is performed.

The organic vertical alignment film can be formed in such a process that, after an organic polymer film is formed on the substrate using a rotation coating method or a print coating method, the organic polymer film is cured for strength, is rubbed (rubbing depth of about 0.8 mm or more), and is cleaned/dried. In a rubbing process, a pretilt angle (alignment angle) is defined on surfaces of the first and second alignment films 130 and 210, and an alignment direction is provided to the liquid crystal (LC).

The first and second alignment films 130 and 210 have a thickness of about 300 Å to 800 Å in consideration of the pretilt angle for suppressing disinclination, or a driving voltage, and have a pretilt angle of about 1° to 1.5°.

When the first and second alignment films 130 and 210 are thinner than a low limit value, it is difficult to make the pretilt angle uniform at each region. Also, when the thickness exceeds a high limit value, the driving voltage can be increased, thereby increasing consumption power.

After the first and second alignment films 130 and 210 are coated on the TFT array substrate 100 and the color filter substrate 200, respectively, they are rubbed to provide an alignment regulation force or a surface fixing force, that is, the pretilt angle and the alignment direction of the liquid crystal provided between the two substrates 100 and 200.

In the structure of FIG. 3 or 4, the rubbing direction, and the common electrode 110 and the pixel electrode 120 can be provided to have an angle of about 20° therebetween.

Instead of a horizontal alignment film used in an in-plane switching mode according to the related art, the inorganic vertical alignment film or the organic vertical alignment film (polyimide-based polymer film) using the APA-FR method is used to properly control the thickness and the rubbing strength, thereby eliminating light leakage and improving black luminance in the step coverage region (R1) of the in-plane switching mode.

Figure 6A:
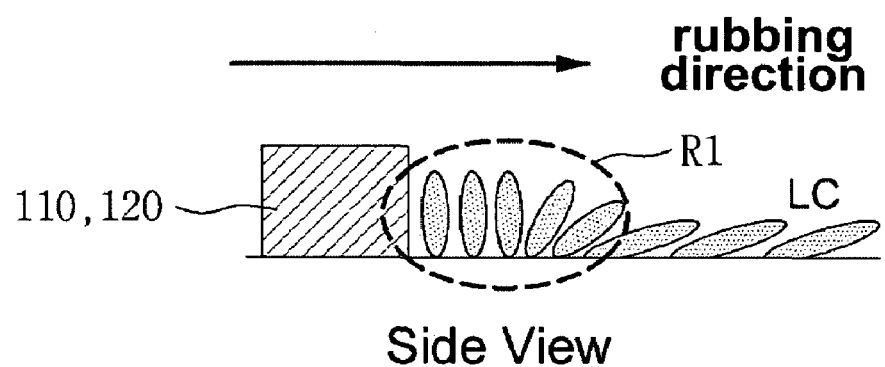
FIGS. 6A and 6B are reference views illustrating a rubbing direction of a vertical alignment film, and alignment of liquid crystal based thereon in an in-plane switching mode liquid crystal display device according to an exemplary embodiment of the present invention.
Figure 6B:
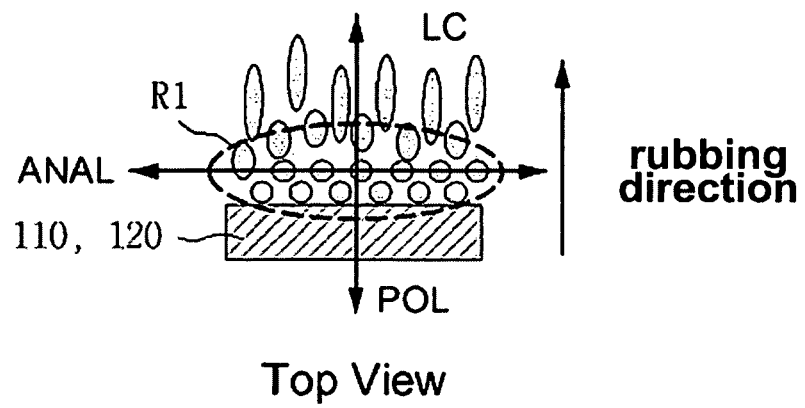

FIGS. 6A and 6B are reference views illustrating the rubbing direction of the vertical alignment film, and the alignment of the liquid crystal based thereon in the in-plane switching mode liquid crystal display device according to an embodiment of the present invention.

In the in-plane switching mode, after the inorganic vertical alignment film or the organic vertical alignment film, instead of the horizontal alignment film according to the related art, is rubbed and provided on the common electrode 110 or the pixel electrode 120, if liquid crystal (LC) is injected to provide the liquid crystal cell, as shown in FIGS. 6A and 6B, the step coverage region (R1) not rubbed due to the step generated in the electrode edge part at the side of the rubbing direction.

However, since the inventive first and second alignment films 130 and 210 are formed using the vertical alignment film, a director of the liquid crystal is provided in all of the vertical directions (non-rubbed portion) or the rubbing directions (weakly rubbed portion) even in the step coverage region (R1) of the poorly rubbed electrode edge part. In other words, in a vertical field switching mode, the alignment film is not rubbed, but in the in-plane switching mode according to an exemplary embodiment of the present invention, the alignment film is rubbed and the liquid crystal is aligned using the vertical alignment film, not the horizontal alignment film. Therefore, light leakage is prevented even in the step coverage region (R1) of the poorly rubbed electrode edge part.

Accordingly, the rubbing direction is substantially parallel to one of the polarization axes (POL and ANAL) which are disposed in a cross-nicol relationship, thereby not generating phase delay owing to a polarization principle. Even the step coverage region (R1) of the electrode edge part not well rubbed has the same black luminance (=0) irrespective of the pretilt angle of the liquid crystal.

FIGS. 7A to 7G are flowcharts illustrating a method for manufacturing the in-plane switching mode liquid crystal display device having the inorganic vertical alignment film according to a first exemplary embodiment of the present invention.

Figure 7A:
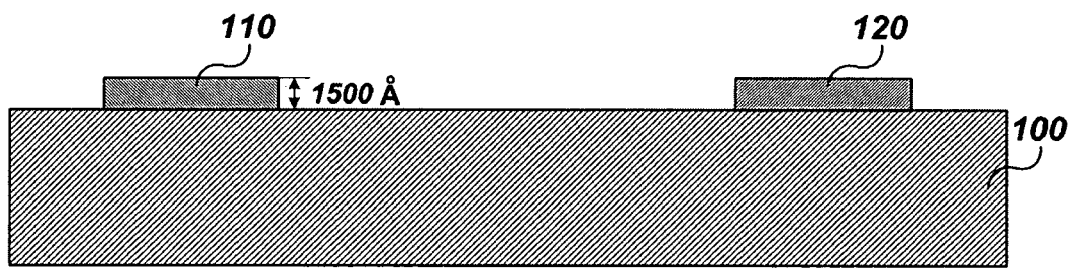
FIGS. 7A to 7G are flowcharts illustrating a method for manufacturing an in-plane switching mode liquid crystal display device having an inorganic vertical alignment film according to a first embodiment of the present invention.

Referring first to FIG. 7A, indium-tin-oxide (ITO), the transparent electrodes 110 and 120, are coated to have a thickness of about 1500 Å on the TFT array substrate 100. The transparent electrodes 110 and 120 correspond to the pixel electrode and the common electrode arranged in an alternating pattern with each other. As described above, a discussion of a TFT forming process and an oxide and passivation forming process having less relationship with the present invention will be omitted.

Figure 7B:
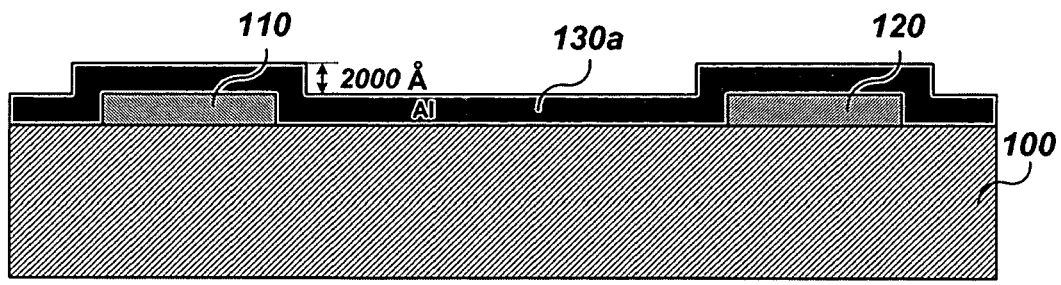

Referring next to FIG. 7B, aluminum (Al) 130a is deposited to have a thickness of about 2000 Å on the pixel region of a whole surface of the substrate 100 comprising the transparent common electrode and pixel electrode 110 and 120 using a sputtering method, thereby forming an aluminum (Al) thin film.

Figure 7C:
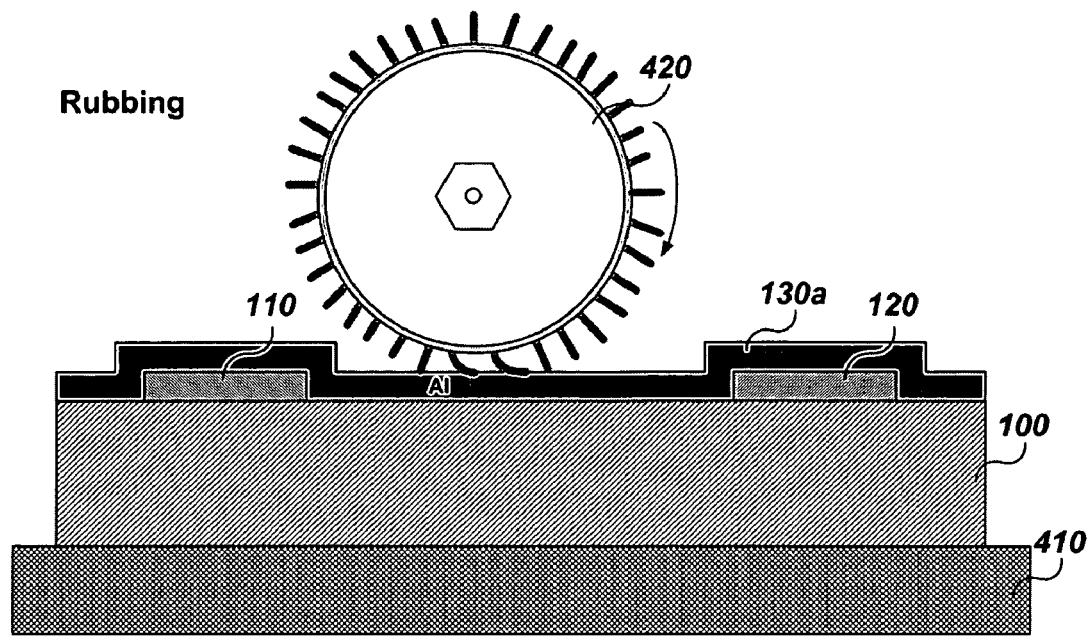

After that, in FIG. 7C, the deposited Al thin film 130a is rubbed on its surface using a rotation roller 420. A reference numeral 410 denotes a stage for mounting and moving the TFT array substrate 100 in a right and left direction. The rotation roller 420 has a diameter of about 40 mm, and its surface is covered with a rayon fiber having a diameter of about 30 μm. The rotation roller 420 has a rotation speed of about 1000 rpm, and the TFT array substrate 100 is transported at a speed of 400 mm/min on the stage 410, and a contact portion between the rayon fiber and the Al thin film 130a is rubbed to have a rubbing depth of about 0.4 mm.

Figure 7D:
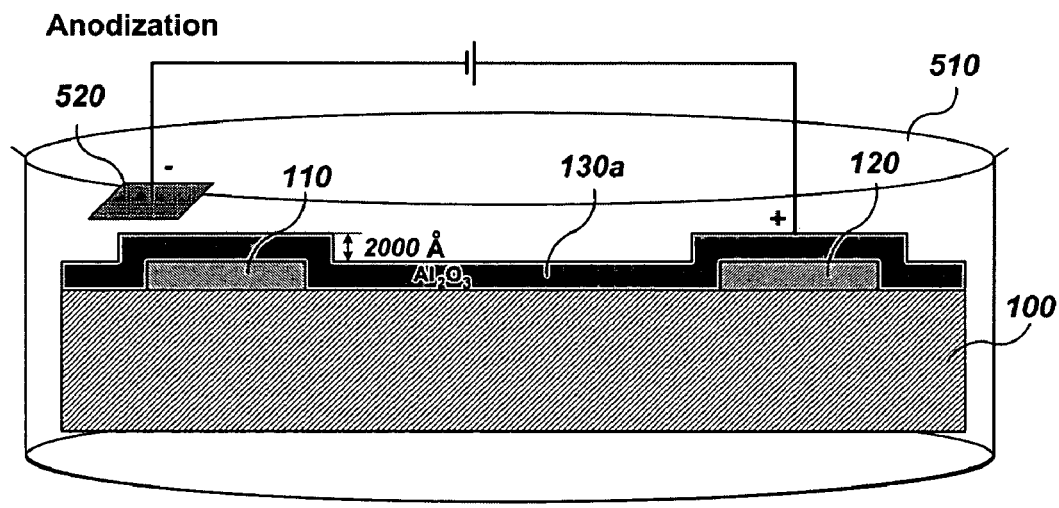

Referring next to FIG. 7D, the rubbed Al thin film 130a is anodized in a 10 mA/dm² constant current mode in a 0.3 mole oxalic acid (H$_2$C$_2$O$_4$) solution 510 for about 75 minutes at a temperature of about 20° C. An anode employs the Al thin film 130*a*, and a cathode employs a platinum plate 520. As a result, the Al thin film 130*a* is changed into an APA-FR thin film, that is, an alumina thin film rubbed and then anodized.

Figure 7E:
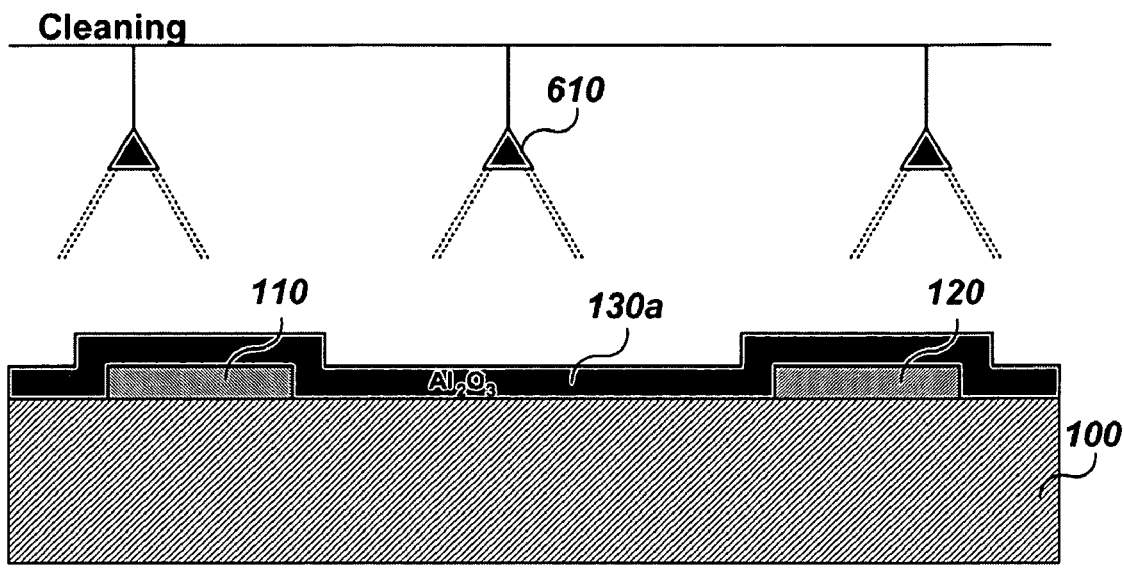
Figure 7F:
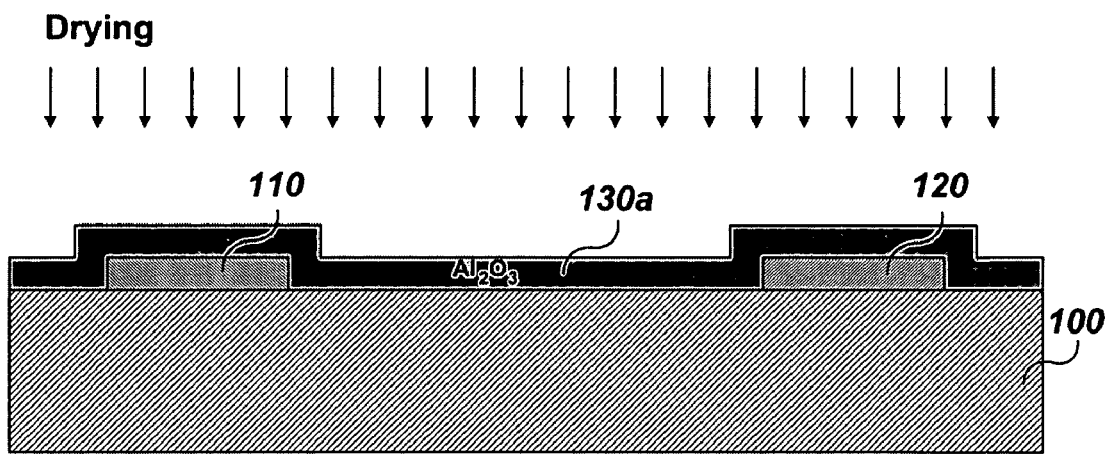

Referring next to FIG. 7E, the APA-FR thin film 130*a* is cleaned for about 60 seconds using the de-ionized water and then, referring to FIG. 7F, is dried for about 20 minutes in a nitrogen (N$_2$) atmosphere at a temperature of about 120° C. As a result, the Al thin film 130*a* becomes the inorganic vertical alignment film, that is, the inorganic oxidation aluminum (Al$_2$O$_3$) having a thickness of about 300 Å to 800 Å.

In the processes of FIGS. 7A to 7F, the TFT array substrate 100 is completed and, in the same manner, the inorganic vertical alignment film can be formed even on the CF substrate 200.

Figure 7G:
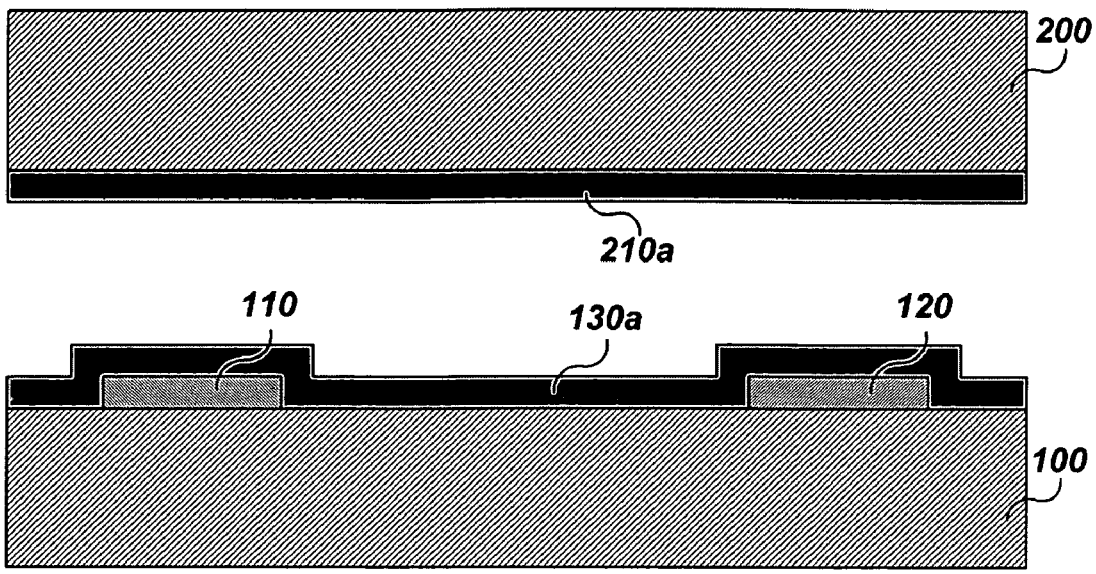

In FIG. 7G, the TFT array substrate 100 and the CF substrate 200 are sealed, thereby completing the in-plane switching mode liquid crystal panel or liquid crystal display device having the inorganic vertical alignment film.

FIGS. 8A to 8F are flowcharts illustrating a method for manufacturing an in-plane switching mode liquid crystal display device having an organic vertical alignment film according to a second exemplary embodiment of the present invention.

Figure 8A:
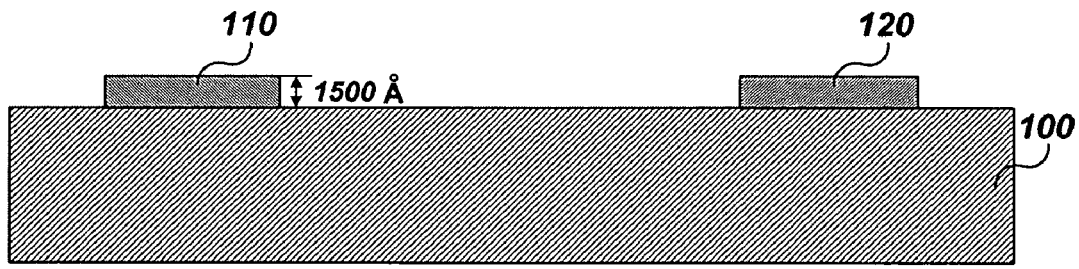
FIGS. 8A to 8F are flowcharts illustrating a method for manufacturing an in-plane switching mode liquid crystal display device having an organic vertical alignment film according to a second embodiment of the present invention.

Referring first to FIG. 8A, indium-tin-oxide (ITO), transparent electrodes 110 and 120, are coated to have a thickness of about 1500 Å on a TFT array substrate 100. The transparent electrodes 110 and 120 correspond to a pixel electrode and a common electrode arranged in an alternating pattern with each other. A discussion of the TFT forming process and an oxide and passivation forming process having less relationship with the present invention will be omitted.

Figure 8B:
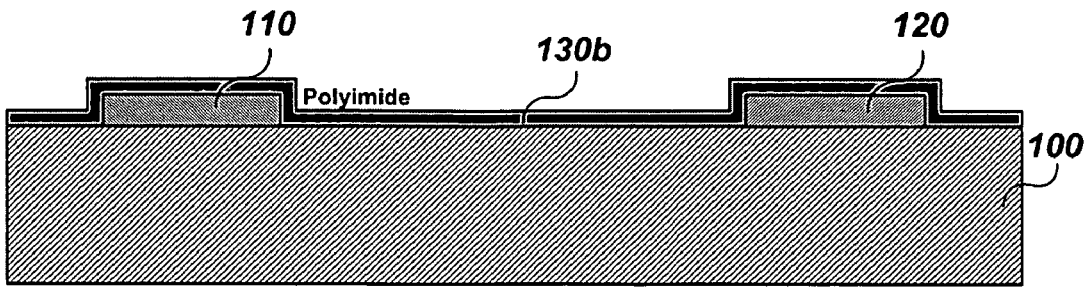

Referring next to FIG. 8B, a polyimide (PI)-based polymer material is deposited to have a thickness of less than about 1000 Å on the pixel region of a whole surface of the substrate 100 comprising the transparent common electrode and pixel electrode 110 and 120, thereby forming an alignment film 130*b*.

Figure 8C:
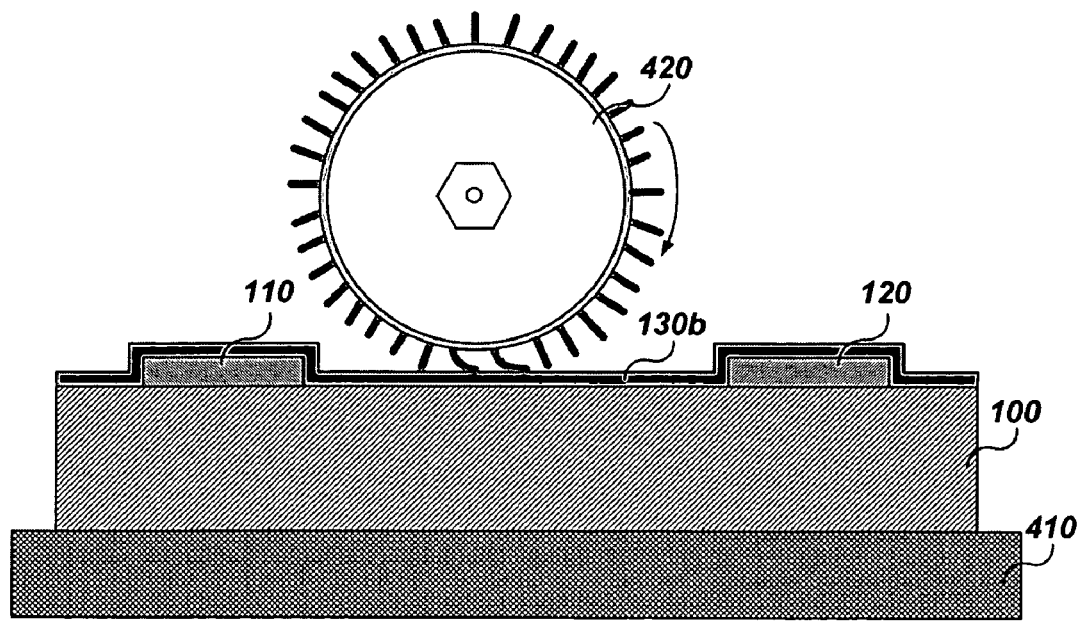

After that, in FIG. 8C, the PI alignment film 130*b* is rubbed on its surface using a rotation roller 420. A reference numeral 410 denotes a stage for mounting and moving the TFT array substrate 100 in a right and left direction. The PI alignment film 130*b* is rubbed to have a rubbing depth of about 0.8 mm or more.

Figure 8D:
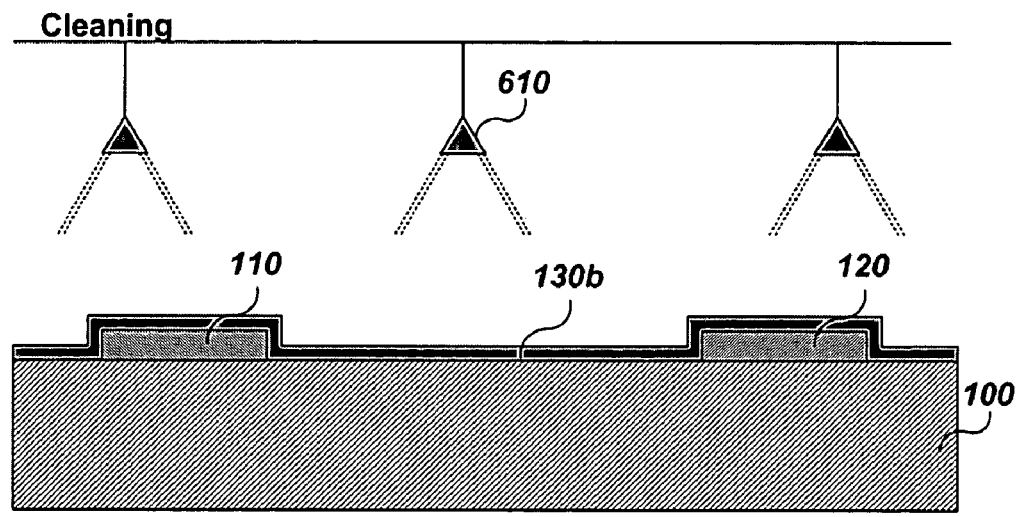
Figure 8E:
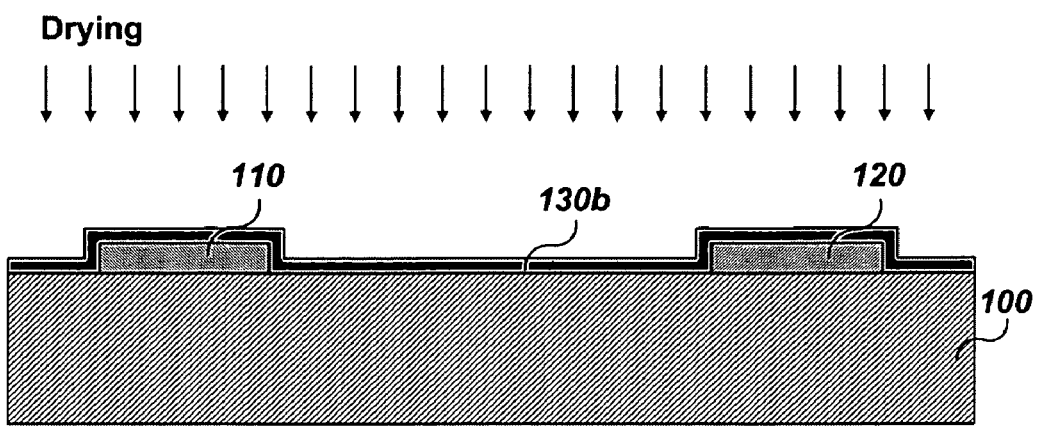

Referring next to FIGS. 8D and 8E, the rubbed alignment film 130*b* is cleaned for about 60 seconds using de-ionized water and then, is dried for about 20 minutes in a nitrogen (N$_2$) atmosphere at a temperature of about 120° C. As a result, the rubbed alignment film 130*b* becomes the organic vertical alignment film of the polyimide-based polymer material.

Figure 8F:
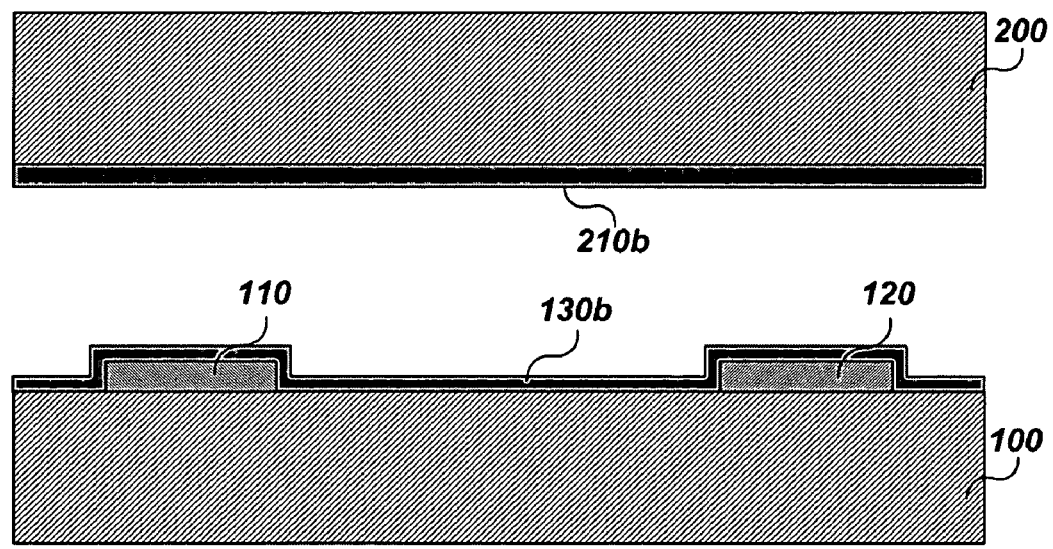

In the processes of FIGS. 8A to 8E, the TFT array substrate 100 is completed and, in the same manner, the organic vertical alignment film can be formed even on the CF substrate 200. Referring to FIG. 8F, the TFT array substrate 100 and the CF substrate 200 are sealed, thereby completing the in-plane switching mode liquid crystal panel or liquid crystal display device having the organic vertical alignment film.

As described above, in the inventive in-plane switching mode liquid crystal display device can employ the vertical alignment film, thereby preventing the light leakage at the electrode edge part not well rubbed and resultantly, improving the black luminance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing an in-plane switching mode liquid crystal display device, comprising:
    providing a common electrode and a pixel electrode in an pixel region, wherein the common and pixel electrodes are not in a switching region of the pixel region;
    depositing a metal thin film on the pixel region;
    rubbing the metal thin film; and
    anodizing the rubbed metal thin film to provide an inorganic vertical alignment film.

2. The method of claim 1, wherein the metal thin film is aluminum (Al).

3. The method of claim 2, wherein in depositing the metal thin film, the aluminum is deposited using a sputtering method to have a thickness of about 2000 Å.

4. The method of claim 1, wherein in the anodizing an anode employs the metal thin film, and a cathode employs a platinum plate.

5. The method of claim 1, wherein the metal thin film is a metal film rubbed and then anodized.

6. The method of claim 5, wherein the metal film is aluminum, and the metal film rubbed and then anodized is an oxide aluminum (Al2O3) thin film.

7. The method of claim 5, wherein the rubbed and anodized metal film has a thickness of about 300 Å to 800 Å.

8. The method of claim 1, wherein, in rubbing the metal thin film, the rubbing direction and the electrodes have an angle of about 20° therebetween.

9. The method of claim 1, wherein, in rubbing the metal thin film, the rubbing direction is substantially parallel to one of polarization axes (POL and ANAL) disposed in a cross-nicol relationship.

* * * * *